United States Patent [19]

Chopra et al.

[11] Patent Number: 4,480,064

[45] Date of Patent: Oct. 30, 1984

[54] COLOR PIGMENT FOR USE IN THE PRODUCTION OF THERMOPLASTIC ARTICLES

[75] Inventors: Kuldip S. Chopra, Grand Island, N.Y.; George E. Ealer; George A. Salensky, both of Whitehouse Station, N.J.

[73] Assignee: Elkem Metals Company, Pittsburgh, Pa.

[21] Appl. No.: 549,284

[22] Filed: Nov. 7, 1983

Related U.S. Application Data

[63] Continuation-in-part of Ser. No. 376,165, May 7, 1982, abandoned, which is a continuation of Ser. No. 162,956, Jun. 25, 1980, abandoned.

[51] Int. Cl.³ ............................................... C08K 3/22
[52] U.S. Cl. ..................................... 524/413; 523/351
[58] Field of Search .......................... 524/413; 523/351

[56] References Cited

U.S. PATENT DOCUMENTS 3,616,200 11/1971 Reibach .
4,206,100 6/1980 Kyo et al. .

FOREIGN PATENT DOCUMENTS 771955 4/1957 United Kingdom .
1243878 8/1971 United Kingdom .
1374975 11/1974 United Kingdom .

OTHER PUBLICATIONS

*Encyclopedia of Polymer Science and Technology*, vol. 10, John Wiley & Sons, 1969, pp. 163-169.

*Primary Examiner*—John C. Bleutge
*Assistant Examiner*—Robert E. L. Sellers
*Attorney, Agent, or Firm*—Lucas & Just

[57] ABSTRACT

Manganomanganic oxide fume or a material containing manganomanganic oxide fume as its principle ingredient is used as a color pigment in the production of thermoplastic articles and particularly thermoplastic films.

6 Claims, No Drawings

COLOR PIGMENT FOR USE IN THE PRODUCTION OF THERMOPLASTIC ARTICLES

This application is a continuation-in-part of application Ser. No. 376,165 filed May 7, 1982 which in turn is a continuation application of Ser. No. 162,956 filed June 25, 1980. Both of these applications Ser. Nos. 376,165 and 162,956 are now abandoned.

The present invention relates to the production of thermoplastic articles and particularly colored thermoplastic films such as those used in the manufacture of trash bags and the like. More specifically, the invention relates to improved color concentrates for use in producing colored thermoplastic articles.

In the production of thermoplastic colored films by conventional methods, a color concentrate containing one or more pigments is mixed together with a thermoplastic resin usually in the form of resin pellets while heating the mixture to elevated temperatures in order to melt the resin pellets and to disperse the color pigments substantially uniformly throughout the resin. An essential requirement of the color concentrate is that it must contain color pigments which are stable and which will not break down at the temperatures contemplated. This is important not only from the standpoint of maintaining good color integrity but also to prevent the occurrence of defects in the film itself. For example, yellow iron oxide ($Fe_2O_3.H_2O$) is a common pigment used to produce brown or tan colored plastic film for making trash bags and the like. It looses water of hydration at about 400° F. When a thermoplastic film containing this pigment is extruded at temperatures which exceed this decomposition temperature, defects are apt to occur in the film. The defects ocur mainly in the form of minute bubbles which result from the water of hydration or moisture that is liberated upon dehydration of the pigment.

The extent to which the defects are likely to occur in the film can be determined by so-called "ash test" wherein a pigment is heated to its decomposition temperature and the percent of residue or ash is then measured. Generally, if a pigment has a high percentage of ash, the losses or volatiles will be less and consequently there will be fewer defects formed in the film. Since it is sometimes desirable or necessary to extrude many of the newly developed thermoplastic resin at high temperatures, the need for improved color pigments having high decomposition temperatures as well as high percentages of ash will be evident.

It is therefore an important object of the present invention to provide an improved method for producing colored thermoplastic articles and particularly colored thermoplastic films such as used in making trash bags and the like, wherein a thermoplastic resin is mixed together with at least one color pigment having good thermal stability and then heated to elevated temperatures to melt the resin and to uniformly disperse the pigment.

Another object of the present invention is to provide an improved color concentrate containing at least one color pigment having a high decomposition temperature and an ash percentage which is greater than that of iron oxide pigments conventionally employed in the prior art.

The foregoing and other related objects and advantages are attained by an improved pigment for use in the production of thermoplastic articles and particularly colored thermoplastic films which comprises manganomanganic oxide fume of a material containing manganomanganic oxide fume as its principle ingredient. In a preferred embodiment of the present invention, the said pigment is employed in the form of a color concentrate containing at least about 20-50% by weight of a thermoplastic resin, the balance comprising added conventional pigments, antioxidants and dispersing agents, for example. The manganomanganic oxide fume pigment may comprise from about 10 to 70% by weight of the total color concentrate.

The present invention is based upon the discovery that pure manganomanganic oxide fume or a material containing predominantly manganomanganic oxide fume in a finely-divided or comminuated state is an ideal color pigment for use in those applications where conventional iron oxide pigments have heretofore been employed in the production of colored thermoplastic articles and particularly colored thermoplastic films. It has been found, for example, that finely-divided manganomanganic oxide fume when used as a color pigment exhibits basically the same color pigmentation as "yellow" or "tan" iron oxide pigments of the prior art, while at the same time the manganomanganic oxide fume pigment is more stable (i.e. it has a decomposition temperature of about 600° F.) and has an ash percentage of not less than about 99%. Consequently, when used as a color pigment to replace conventional iron oxides, extrusion temperatures can be used which are far in excess of those now commonly employed.

It is desirable that manganomanganic oxide fume used as the color pigment should have a finely-divided or comminuted particle size. For example, the particle size of the manganomanganic oxide fume used in the production of thermoplastic film should be less than about 2 microns. This is important in order to uniformly disperse the pigment throughout the resin and also to obtain the desired degree of opacity. In molding applications for making other thermoplastic articles, a larger particle size can be tolerated although it is desirable from the standpoint of opacity to employ as small a particle size as possible. Generally, a range of particle size of between about 0.1 and about 3 to 4 microns is satisfactory in these applications.

As indicated, the manganomanganic oxide fume pigment used in the practice of the present invention may be essentially pure manganomanganic oxide fume or may be a composition or material containing predominantly manganomanganic oxide fume, i.e. greater than about 60% by weight.

The manganomanganic oxide fume of the present invention is most conveniently prepared by passing a stream of oxygen through or across the surface of a molten bath of ferromanganese. Conventional ferromanganese produced in a blast furnace or in an electrometallurgical furnace and the like at high temperatures of about 1200° C. or more may contain up to 6 or more percent of carbon. The carbon content is usually reduced, as for example, to about 1.5% by blowing oxygen or a mixture of oxygen and air through or against the surface of a bath of molten ferro-manganese. This is done in a separate vessel that contains a molten ferromanganese bath freshly tapped from the electric furnace and at a temperature of about 1000° C. or more and preferably at about 1300° C. or more.

One procedure for reducing the carbon content of molten ferro-manganese is described in U.S. Pat. No. 3,305,352 issued Feb. 21, 1967, the description of which is incorporated by reference herein. In this preferred procedure for producing the manganomanganic oxide fume of the present invention, ferro-manganese is tapped from the electric furnace in which it is produced into a treating vessel such as a ladle or furnace at a temperature of about 1300° C. or more. Any slag is preferably skimmed off and then oxygen is top blown against the surface of the molten ferro-manganese bath by any convenient means such as one or more conventional oxygen blowing lances held about an inch above the surface to direct one or more streams of oxygen at a pressure of about 110 to about 150 p.s.i. to impinge against the surface of the bath. The flow of oxygen is about 4 to about 5 pounds per minute for a 500 pound molten bath in a ladle about 30 inches high and 20 inches inside diameter. The foregoing procedure may be scaled up as desired. The off-gas thereby produced contains very finely-divided particles of manganomanganic oxide fume of spherical configuration which are easily recovered from the off-gas by conventional recovery apparatus.

If desired, the manganomanganic oxide fume of the present invention may be produced as a by-product of the specific procedure described in U.S. Pat. No. 3,305,352 for reducing the carbon content of the ferro-manganese bath. In such case, the ferro-manganese bath will be at a temperature of about 1250° C. and oxygen will be top blown at a rate sufficient to heat the bath to a temperature of 1700° C. before the carbon content of the molten metal has been reduced to 1.5%. Oxygen blowing will continue until the bath temperature reaches about 1750° C. as described in the patent. The manganomanganic oxide fume is recovered from the off-gas in conventional manner.

The terms $Mn_3O_4$ fume and manganomanganic oxide fume used in the specification and claims herein mean the finely-divided spherical particles of fume recovered from the oxygen blowing of molten ferro-manganese as described above.

The data given below outlines some typical characteristics of the manganomanganic oxide fume produced as specified hereinabove for carrying out the present invention.

Chemical Formula: Essentially $Mn_3O_4$.
Typically, 90% to 95% by weight manganomanganic oxide, the balance being a mixture which includes calcium oxide, magnesium oxide, potassium oxide and silica with less than about 1% by weight of free manganese metal.
Chemical Analysis (typical wt%): 65.27Mn; 2.03Fe; 0.029Al; 0.28Si; 0.17C; 0.040P; 0.045As; 0.46Ca; 1.43Mg; 0.072K; 0.023Cr; and 0.002Pb.
Bulk Density: 45-90 lbs/ft$^3$
Moisture: 0.22% (1 hour at 107° C.)
Particle Size: 98% below about 10 microns. (99% will pass through a 325 mesh Tyler screen)
pH: 9-13 (50% $Mn_3O_4$ in distilled $H_2O$)
Shape: Spherical
Specific Gravity: 4.6 to 4.75 grams/cc
Thermal Stability: No effect up to 600° C.

The average size of the spherical particles of the fume is about 90% below 2 microns. The fume may be screened to eliminate particles of 2 microns and above for best results when used in extruding thermoplastic film.

The manganomanganic oxide fume particles of the present invention are unique in that the fume produced at high temperature results in particles of spherical configuration as compared to the particles of conventional manganese oxides, synthetic or natural, which do not have spherical configurations. It is the spherical configuration of the particles of manganomanganic fume produced at high temperatures of about 1250° C. which render the spherical fume particles surprisingly useful and makes it possible to carry out the extrusion of thermoplastic resins at temperatures of up to about 600° F.

The manganomanganic oxide fume pigment of the present invention can be used with a variety of thermoplastic resins for producing colored thermoplastic articles and in particular opaque plastic films such as conventionally used in the manufacture of trash bags and the like. For instance, the pigment can be employed with polyolefin resins such as polyethylene and polypropylene, as well as polyesters, polyamides and polysulfone.

Although it is possible to add the manganomanganic oxide fume pigment separately to the thermoplastic resin along with other pigments, if desired, in conventional extrusion apparatus, preferably, the manganomanganic oxide fume pigment is added to the base resin in the form of a color concentrate. The concentrate is preferred since the manganomanganic oxide fume pigment and other additives are predispersed therein and assure a more uniform distribution of all the additives throughout the thermoplastic resin.

A typical color concentrate for use with a polyethylene resin base, for example, would be as follows:

| Weight % | Ingredient |
|---|---|
| 49.35 | Polyethylene Resin |
| 0.15 | Antioxidant |
| 30.00 | Manganomanganic Oxide Fume Pigment |
| 20.00 | $TiO_2$ Pigment |
| 0.5 | Dispersion Agent |

Titanium oxide ($TiO_2$) as well as other known pigments including iron oxide if desired, may be used in conjunction with the manganomanganic oxide fume pigment of the present invention in various amounts in order to attain the desired tint or color. Basically, the manganomanganic oxide fume pigment yields a distinctive brown or tan color which is more yellowish and darker than the standard "yellow" iron oxide pigment. The addition of $TiO_2$ to the pigment tends to lighten the basic color depending on the amount that is used. Conversely, the color of the manganomanganic oxide fume pigment can be substantially darkened by the addition of carbon black which is also a known pigment in the prior art. In fact, these two pigments are used in standard "tint" and "shade" tests to determine the adaptability of a given pigment to color modification. The amount of the various pigments used in the color concentrate will depend upon the particular color or tint to be attained. Generally, the color concentrate will contain from about 10% to 70% by weight of the manganomanganic oxide fume pigment, the balance being composed mostly of the basic resin and other color modifying pigments such as $TiO_2$.

The color concentrate of the present invention may also contain an antioxidant such as tetrakis [methylene 3-(3',5-di-t-butyl-4'hydroxyphenyl) propionate] methane-Irgonox 1010-Ciba Geigy, butylated hydroxy toluene or alkylated diphenolics. The purpose of the antioxidant is to prevent degradation of the polymer at elevated temperatures.

A dispersion agent may also be used in the color concentrate in order to assure that all of the pigments are uniformly dispersed throughout the concentrate and resin. A suitable dispersion agent may be, for example, aluminum tristearate.

It will be evident, of course, that when other oxide pigments are employed such as $TiO_2$, they should also have a finely-divided or a comminuted particle size, preferably less than about 2 microns in the case of thermoplastic films. Also, as noted, the manganomanganic oxide fume pigment of the present invention may also be used in combination with various types of iron oxide pigments, i.e. yellow or red iron oxide. However, care should be taken to determine that the particular extrusion temperatures used do not exceed the decomposition temperature of the iron oxide pigment.

The shaped colored thermoplastic article made in accordance with the present invention will generally contain from about 0.1 to 20% by weight of the manganomanganic oxide fume pigment whether added directly to the mix or in the form of the color concentrate. The thermoplastic articles may be shaped by extrusion or by molding procedures well-known in the art.

In an example of the present invention, plastic film was extruded using a conventional extrusion apparatus and a polyethylene resin base containing finely-divided manganomanganic oxide ($Mn_3O_4$) fume as a pigment. The pigment imparted to the film a very distinctive brown color which was yellowish and darker than standard yellow iron oxide. It was also found that the manganomanganic oxide fume pigment dispersed quite readily throughout the film resin. The film was also tested for opacity. The opacity of the film produced with the manganomanganic oxide fume pigment was found to be slightly lower than that of film made with standard yellow iron oxide but was acceptable. The manganomanganic oxide fume pigment was also subjected to standard ash tests wherein the pigment was fired at temperatures of about 600° F. and the residue analyzed. It was found that manganomanganic oxide fume had an ash percent of about 99.85% which compares quite favorably to the ash percent of standard yellow iron oxide e.g. about 88%. Thus the manganomanganic oxide fume pigment can be used in high temperature extrusion processes for producing thermoplastic articles or film where it has not heretofore been possible to employ other pigments, such as yellow iron oxide, which decompose at lower temperatures and yield a high percentage of volatiles (e.g. water of hydration) on the order of 10-15%. The manganomanganic oxide fume pigment was also subjected to standard color mass tone and tint test and was found to be quite readily adaptable to color modification by the addition of other pigments such as $TiO_2$.

Opacity of extruded polyethylene film improves with reduction in the size of the particles. Reducing the size of the manganomanganic fume particles from about less than 2 microns down to less than 1 micron will increase the opacity of the extruded polyethylene film.

It will be understood that it is intended to cover all modifications of the preferred form of invention herein selected for the purpose of illustration which do not constitute a departure from the spirit and scope of the invention.

What is claimed is:

1. An improved method for producing colored polyethylene thermoplastic articles which comprises the steps of forming a mixture consisting essentially of polyethylene thermoplastic resin together with at least one color pigment of finely-divided manganomanganic oxide fume, in amounts such that said polyethylene thermoplastic articles will contain from about 0.1% to 20% by weight of said pigment, said finely-divided manganomanganic oxide fume having spherical particles of a size of between about 0.1 and about 4.0 microns, heating the mixture to elevated temperatures in order to melt the polyethylene thermoplastic resin and to uniformly disperse the color pigment throughout the resin and then shaping the polyethylene thermoplastic resin into the finished article.

2. The method according to claim 1 wherein the manganomanganic oxide fume color pigment is added to the thermoplastic resin in the form of a color concentrate consisting essentially of at least about 20 to 50% by weight of the thermoplastic resin, about 10 to 70% by weight of finely divided manganomanganic oxide fume pigment having spherical particles of about 0.1 to about 4.0 microns in size and 0 to 70% by weight in the aggregate of additional pigments, antioxidents and a dispersion agent.

3. A color concentrate for use in the production of colored polyethylene thermoplastic articles consisting essentially of from about 20-50% by weight of polyethylene thermoplastic resin, from about 10 to 70% by weight of a finely divided manganomanganic oxide fume pigment having spherical particles of from about 0.1 to about 4.0 microns in size and from 0 to 70% by weight in the aggregate of additional pigments, antioxidents and a dispersion agent.

4. A colored polyethylene thermoplastic article consisting essentially of polyethylene thermoplastic resin containing from about 0.1% to 20% by weight of a finely divided manganomanganic oxide fume pigment having spherical particles from about 0.1 to about 4.0 microns in size.

5. A colored polyethylene thermoplastic article according to claim 4 which is an extruded film.

6. A colored thermoplastic article according to claim 4 which is a molded article.

* * * * *

UNITED STATES PATENT AND TRADEMARK OFFICE
CERTIFICATE OF CORRECTION

PATENT NO. : 4,480,064
DATED : October 30, 1984
INVENTOR(S) : Chopra et al.

It is certified that error appears in the above-identified patent and that said Letters Patent are hereby corrected as shown below:

Column 1, line 35, change "ocur" to --occur--.

Column 2, line 15, change "comminuated" to --comminuted--.

Column 6, line 35, change "antioxidents" to --antioxidants--.

Column 6, lines 44-45, change "antioxidents" to --antioxidants--.

Signed and Sealed this

Ninth Day of April 1985

[SEAL]

Attest:

DONALD J. QUIGG

Attesting Officer     Acting Commissioner of Patents and Trademarks